United States Patent [19]

Xu

[11] Patent Number: 5,777,709
[45] Date of Patent: Jul. 7, 1998

[54] LIQUID CRYSTAL DISPLAY WITH TWO POSITIVE TILTED RETARDATION FILMS AND TWO NEGATIVE RETARDANT FILMS

[75] Inventor: Gang Xu, Northville, Mich.

[73] Assignee: OIS Optical Imaging Systems, Inc., Northville, Mich.

[21] Appl. No.: 726,654

[22] Filed: Oct. 7, 1996

Related U.S. Application Data

[63] Continuation of Ser. No. 383,200, Feb. 3, 1995, Pat. No. 5,638,200.
[51] Int. Cl.$^6$ .................................................. G02F 1/1335
[52] U.S. Cl. ............................................. 349/120; 349/121
[58] Field of Search ............................... 349/119, 120, 349/117; 359/494

[56] References Cited

U.S. PATENT DOCUMENTS

| | | |
|---|---|---|
| 5,237,438 | 8/1993 | Miyashita et al. . |
| 5,249,071 | 9/1993 | Yoshimizu et al. . |
| 5,344,916 | 9/1994 | Harris et al. . |
| 5,375,006 | 12/1994 | Haas . |
| 5,430,565 | 7/1995 | Yamanouchi et al. . |
| 5,460,748 | 10/1995 | Mazaki et al. . |
| 5,474,731 | 12/1995 | Morikawa et al. ............... 264/230 |
| 5,490,006 | 2/1996 | Masumoto et al. . |
| 5,504,603 | 4/1996 | Winker et al. . |
| 5,506,706 | 4/1996 | Yamahara et al. . |

FOREIGN PATENT DOCUMENTS 06174920  6/1994  Japan .

*Primary Examiner*—William L. Sikes
*Assistant Examiner*—Kenneth Parker
*Attorney, Agent, or Firm*—Myers Liniak & Berenato

[57] ABSTRACT

A liquid crystal display includes a tilted retarder. The tilted retarder has an optical axis which is aligned at an angle of from about 5° to 15° with respect to normal. Thus, because the optical axis of the liquid crystal layer is aligned at an angle to one side of normal and the optical axis of the tilted retarder(s) is at an angle to the other side of normal, the retardation effects substantially cancel one another out. Tilted retarder(s) may be used in combination with negatively birefringent retarders according to certain embodiments of this invention in twisted nematic normally white displays.

5 Claims, 14 Drawing Sheets

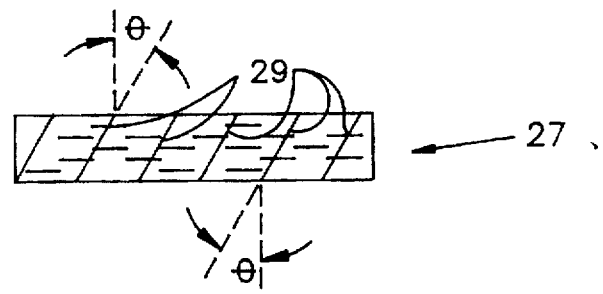
Fig. 8(a)
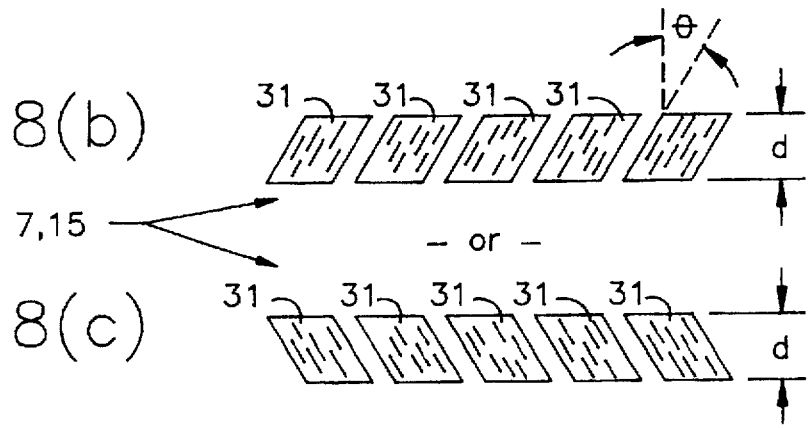
Fig. 8(b)
7,15
– or –
Fig. 8(c)
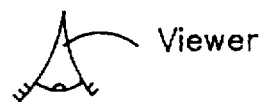
Fig. 7
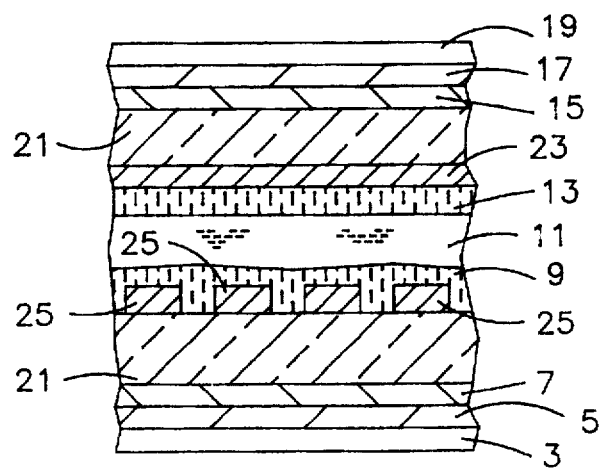

LIQUID CRYSTAL DISPLAY WITH TWO POSITIVE TILTED RETARDATION FILMS AND TWO NEGATIVE RETARDANT FILMS

This is a continuation of application Ser. No. 08/383,200, filed Feb. 3, 1995, now U.S. Pat. No. 5,638,200.

This invention relates to a liquid crystal display (LCD) having at least one retardation film. More particularly, this invention relates to a liquid crystal display having a tilted retardation film, the tilted retardation film having an optical axis which is tilted with respect to normal.

BACKGROUND OF THE INVENTION

Liquid crystal materials are useful for electronic displays because light traveling through a layer of liquid crystal (LC) material is affected by the anisotropic or birefringent value ($\Delta N$) of the material, which in turn can be controlled by the application of a voltage across the LC material. Liquid crystal displays are commonly used in applications such as digital watches, calculators, portable computers, avionic cockpit displays, and many other types of electronic devices which utilize the liquid crystal advantages of long life and low power consumption.

Gray level performance and the corresponding amount of inversion are important characteristics in determining the quality of a liquid crystal display (LCD). Conventional LCDs typically utilize anywhere from about eight to sixty-four different driving voltages. These different driving voltages are generally referred to as "gray level" voltages. The intensity or shade of light transmitted through the pixel or display depends upon the driving voltage. Accordingly, gray level voltages are used to generate dissimilar shades of color so as to create different colors when, for example, these shades are mixed with one another.

Preferably, in a normally white (NW) twisted nematic (TN) liquid crystal display, the higher the driving voltage, the lower the intensity (fL) of light transmitted through the display panel. Thus, the lower the driving voltage, the higher the intensity of light reaching the viewer in preferable circumstances. The opposite is true in normally black (NB) twisted nematic displays.

By utilizing multiple gray level driving voltages, one can manipulate, for example, normally white and normally black twisted nematic LCDs to emit desired intensities and shades of color. A gray level voltage is generally known as any driving voltage greater than $V_{th}$ (threshold voltage) up to about 5.0–6.5 volts. An exemplary $V_{th}$ is about 1.0 volt.

In normally white TN displays, it is desirable to have a transmission vs. driving voltage curve wherein the amount of light reaching the viewer continually and monotonically decreases as the driving voltage increases.

In other words, it is desirable to have gray level performance in a NW display such that the transmission at 6.0 volts is less than that at 5.0 volts, which in turn is less than that at 4.0 volts, which is less than that at 3.0 volts, which is less than that at 2 volts, etc. Such good gray level curves across a wide range of viewing angles allows for the intensity of light reaching the viewer to be easily and consistently controlled by the gray level voltages thereby permitting the viewer to see the same image from all viewing angles.

FIGS. 1–2 are computer simulation transmission vs. driving voltage graphs of a prior art TN normally white liquid crystal display which is not provided with any retarders. FIG. 1 plots transmission vs. driving voltage for a plurality of horizontal viewing angles aligned along the 0° vertical viewing axis while FIG. 2 plots transmission vs. driving voltage for a plurality of vertical viewing angles all aligned along the 0° horizontal viewing axis. The prior art normally white LCD of FIGS. 1–2 had a cell gap of 5.50 µm, a pretilt angle of about 3°, and front and rear linear polarizers whose transmission axes were arranged at an angle of about 90° with respect to one another. Light having a wavelength of about 550 nm was utilized in plotting the graphs of FIGS. 1–2.

The purpose of prior art FIGS. 1–2 is to illustrate the fact that when no retarders or retardation films are provided, a normally white TN LCD experiences significant inversion problems at certain horizontal viewing angles. The vertical angles along the 0° horizontal axis plotted in FIG. 2 do not experience significant inversion problems as illustrated by the fact that each transmission vs. driving voltage curve in FIG. 2 when gray level voltages are applied decreases continually and monotonically for the most part as the driving voltage increases. However, the horizontal viewing angles plotted in prior art FIG. 1 experience significant inversion problems as evident by the fact that at least the ±60° horizontal viewing angle curves and the ±45° horizontal viewing angle curves increase a substantial amount with respect to transmission % as the driving voltage rises past about 3.0 volts.

In other words, the horizontal viewing angles of ±45° and ±60° along the 0° vertical viewing axis plotted in FIG. 1 experience undesirable inversion. Unlike some of the other plotted viewing angles, these four curves in the gray level range do not continually and monotonically decrease as the driving voltage increases. Contrary to this, they actually increase as the driving voltage rises above about 3.0 volts thereby creating what is known in the art as an "inversion hump". The inversion humps illustrated in FIG. 1 include only rise portions. However, such inversion humps often include both rise and fall portions as will be appreciated by those of skill in the art thus enabling the "inversion humps" to actually look like humps.

An ideal transmission vs. driving voltage curve for NW display has a decreased transmission for each increase in gray level driving voltage at all viewing angles. The curves of FIG. 2, while not perfect, are examples of satisfactory transmission vs. driving voltage curves with respect to inversion humps.

In contrast to this, the inversion humps shown in FIG. 1 of at least the ±45° and ±60° horizontal angles represent increases in transmission for corresponding increases in gray level driving voltages above about 3 volts. As will be recognized by those of skill in the art, the illustrated inversion humps create problems because while transmission at certain viewing angles is either decreasing or remaining steady, transmission at the problematic angles of ±45° and ±60° horizontal is rising substantially thereby causing different images to be portrayed to the viewer at different viewing angles.

While the prior art normally white TN LCD of FIGS. 1–2 void of retarders experiences inversion problems at certain horizontal angles, another prior art normally white TN LCD (including retarders) is portrayed in computer simulation FIGS. 3–4. This LCD suffers from inversion not at horizontal viewing angles, but at the vertical viewing angles of ±30° and +40°. Thus, while the FIGS. 1–2 LCD had inversion problems in both the positive and negative horizontal regions, the FIGS. 3–4 LCD experiences inversion only in the positive vertical viewing region.

The prior art normally white LCD plotted in prior art FIGS. 3–4 had a cell gap of 5.50 µm, a pretilt angle of about 3°, front and rear linear polarizers whose transmission axes were aligned about 90° from one another to define a normally white TN cell, and a pair of negatively birefringent retardation films each having a retardation value of about −180 nm. In this NW display, the first retarder was disposed on the front side of the LC layer between the glass substrate and the front polarizer and the second retarder was located on the rear side of the LC layer between the rear glass substrate and the rear polarizer. Light having a wavelength of about 550 nm was utilized in the FIGS. 3–4 computer simulations.

As shown in FIG. 3, this normally white LCD did not experience substantial inversion at the horizontal viewing angles plotted along the 0° vertical axis. Unfortunately, this display did suffer from inversion at the plotted vertical viewing angles of +30° and +40° shown in FIG. 4. The inversion humps for these particular vertical viewing angles cause the viewer to see different images at these angles than at the other plotted viewing angles when gray level voltages of from about 2.0 to 6.0 volts are utilized. This, of course, is undesirable.

As can be seen from prior art FIGS. 1–4, a typical normally white LCD without retarders experiences inversion problems in both the positive and negative horizontal viewing regions. While it may be difficult to see, the +60° and −60° horizontal curves in FIG. 1 overlap one another. The same is true for the +45° and −45° curves as well as the remaining horizontal curves in FIG. 1. This is also the case in all other horizontal (not vertical) transmission versus driving voltage graphs herein.

However, when a pair of negatively birefringent retarders are provided to the display, the inversion problem shifts from the positive and negative horizontal regions (FIG. 1) to the positive vertical region (FIG. 4). Thus, while the addition of the retarders eliminates the problem of inversion in the horizontal viewing regions, it creates a similar problem in the positive vertical viewing region.

It is apparent from the above that there exists a need in the art for a liquid crystal display which can substantially eliminate the above discussed problems of inversion while still providing the contrast ratio benefits given by retardation films. Such a display would, of course, have improved gray level viewing characteristics and a better overall appearance to the viewer.

The computer simulations of normally white LCDs set forth herein each included a liquid crystal material with a birefringence ($\Delta N$) of 0.084 at room temperature, such as that of Model No. ZLI-4718 commercially available from Merck.

The term "retardation value" as used herein means "d.$\Delta N$" of the retardation film or plate, where "d" is the film thickness and "$\Delta N$" is the film birefringence (either positive or negative). The retardation value can be positive or negative depending upon the value of the film birefringence.

SUMMARY OF THE INVENTION

Generally speaking, this invention fulfills the above-described needs in the art by providing a liquid crystal display comprising:

a liquid crystal layer; and a tilted retarder defining a plane substantially parallel to the liquid crystal layer, the tilted retarder having an optical axis tilted $\Theta°$ from normal, where $\Theta$ is from about 3° to 20°.

This invention further fulfills the above-described needs in the art by providing a liquid crystal display comprising:

a liquid crystal layer;

a backlight for illuminating the liquid crystal layer;

a rear polarizer disposed between the backlight and the liquid crystal layer;

a front polarizer disposed on the viewer side of the liquid crystal layer; and a first tilted uniaxial retarder having a positive birefringent value, the tilted retarder being substantially parallel to the rear and front polarizers and having an optical axis tilted $\Theta°$ from normal, where $\Theta$ is from about 5° to 15°.

This invention will now be described with respect to certain embodiments thereof, accompanied by certain illustrations, wherein:

IN THE DRAWINGS

FIG. 7 is a partial side cross-sectional view of the liquid crystal display of FIGS. 5–6.

Figure 5:
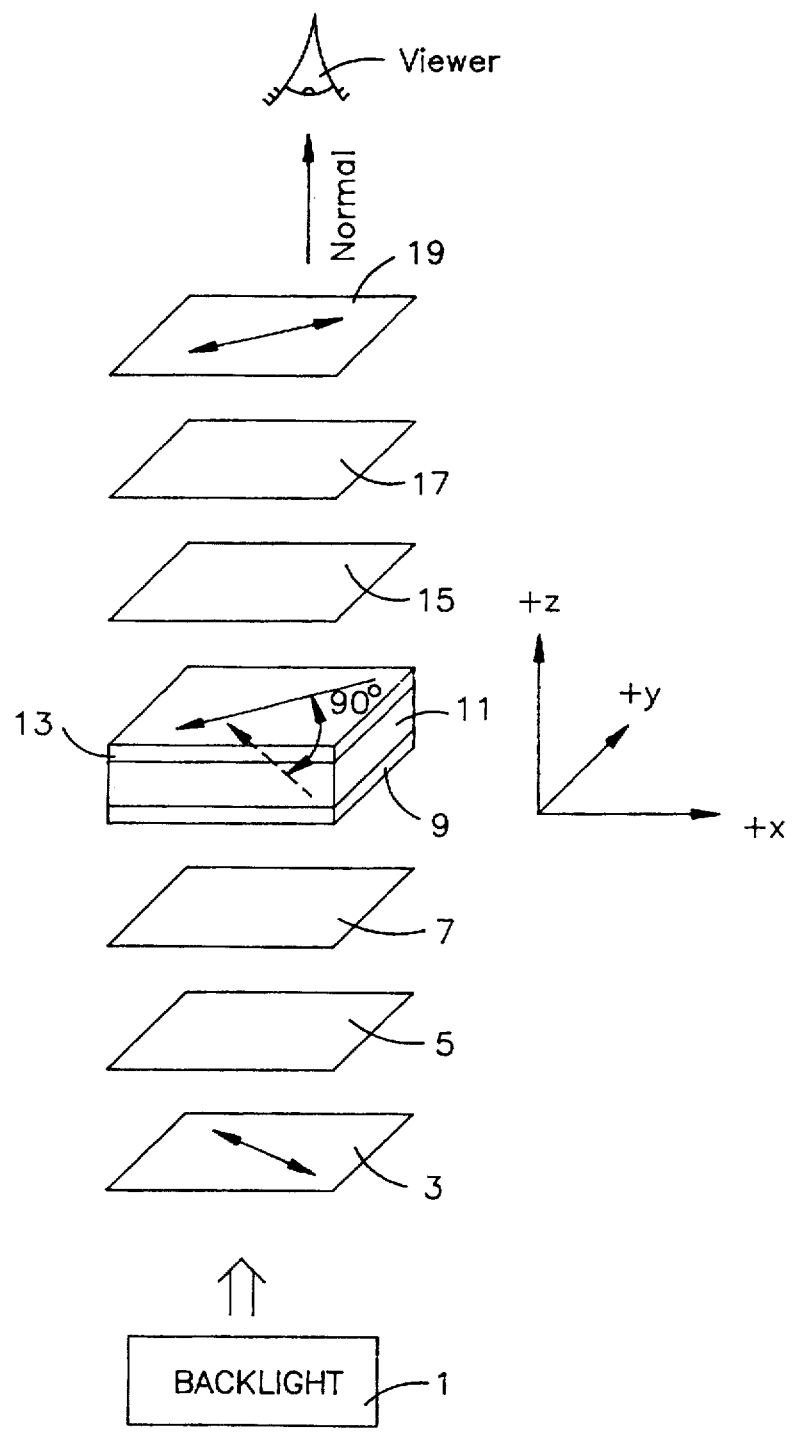
FIG. 5 is an exploded schematic diagram of the optical components and their respective orientations of a normally white TN LCD according to a first embodiment of this invention.
Figure 6:
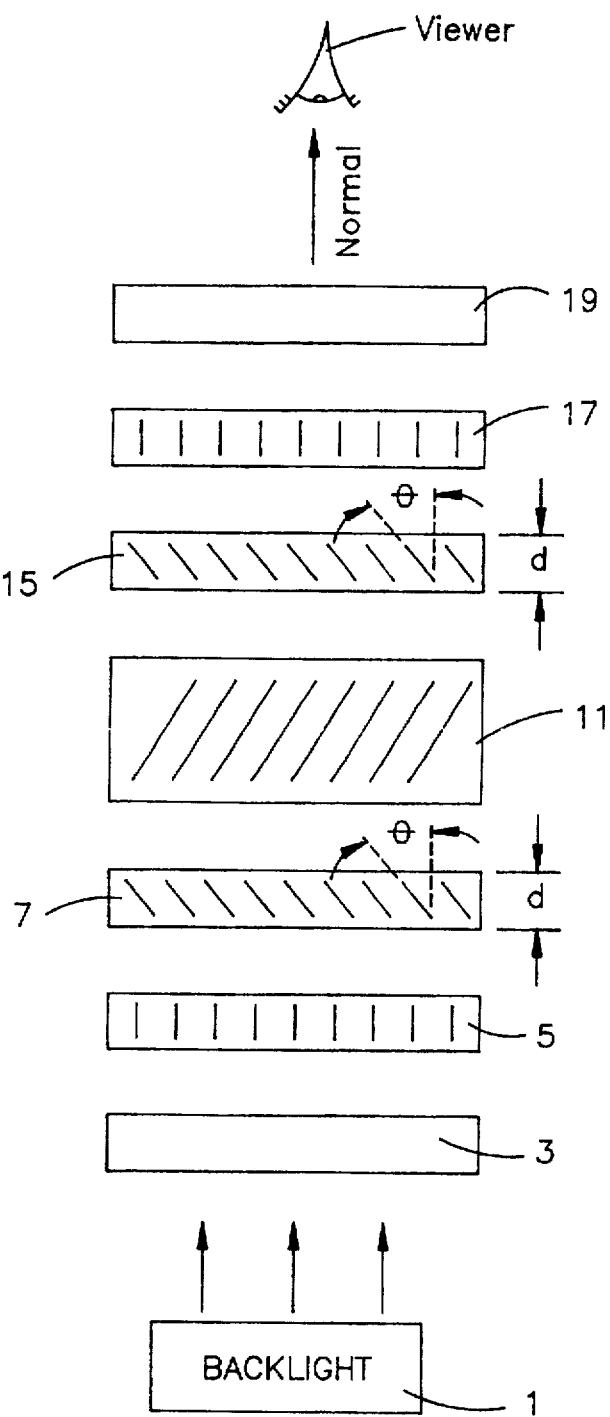
FIG. 6 is an exploded schematic side view of the optical components and their respective orientations of the normally white LCD of FIG. 5.

FIGS. 8(a), 8(b), and 8(c) are diagrams illustrating a process for manufacturing the tilted retarders of FIGS. 5–7.

Figure 9:
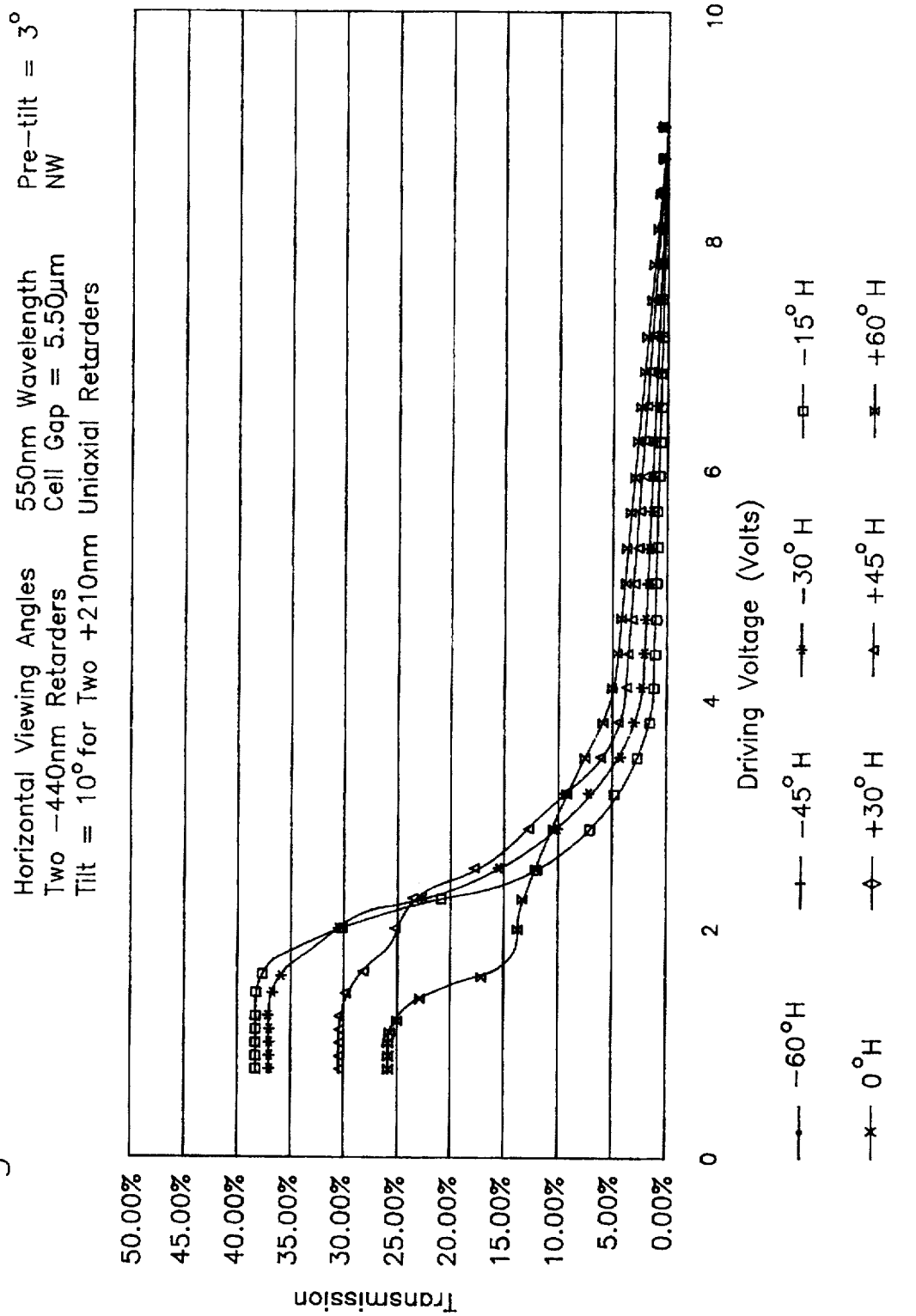

FIG. 9 is a computer simulation transmission vs. driving voltage graph of the NW TN LCD of FIGS. 5–7 when the optical axes of the tilted retarders were tilted about 10° from normal, this graph plotting a plurality of horizontal viewing angles aligned along the 0° vertical axis.

Figure 10:
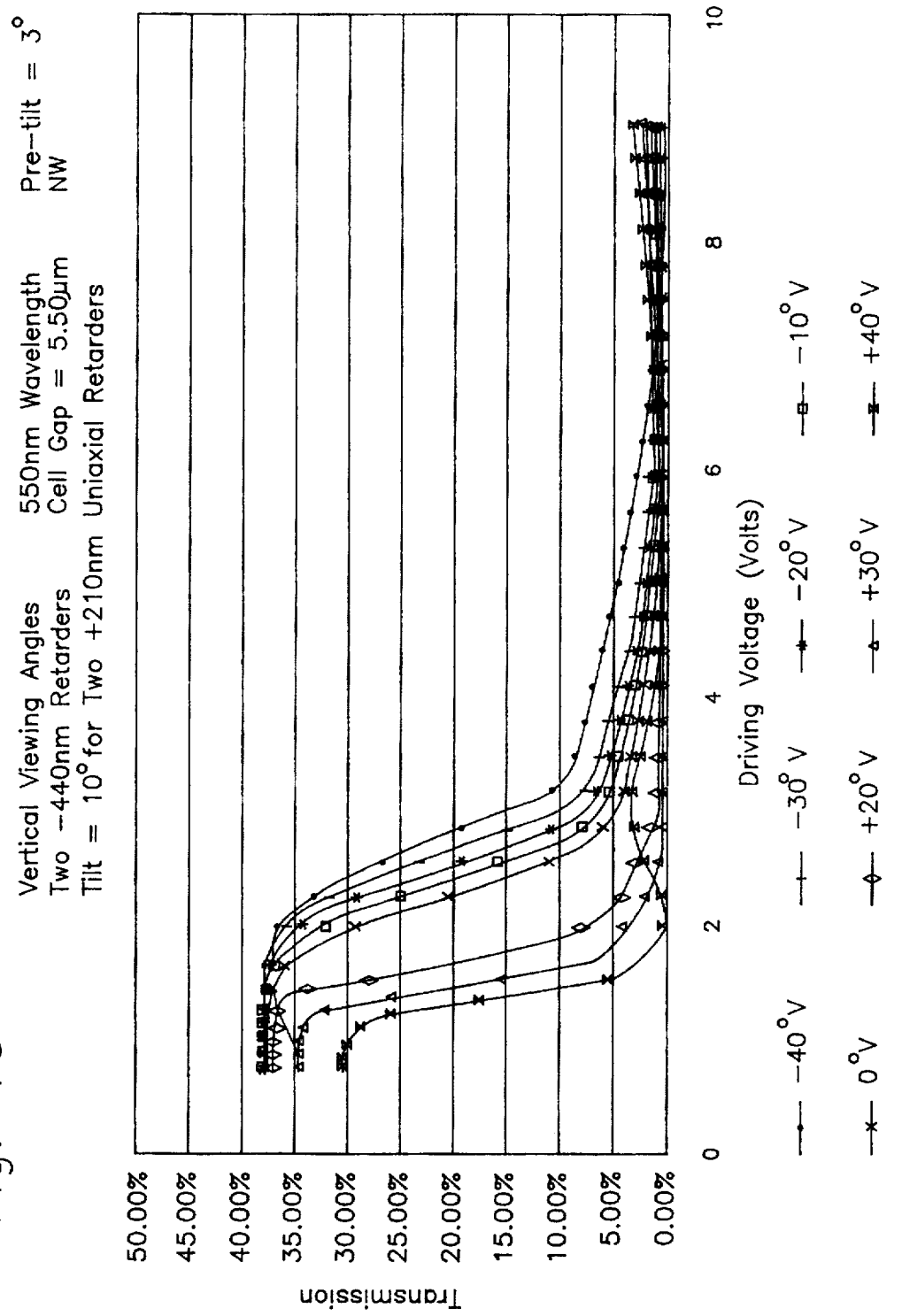

FIG. 10 is a computer simulation transmission vs. driving voltage graph of the FIG. 9 LCD, this graph plotting a plurality of vertical viewing angles aligned along the 0° horizontal viewing axis.

Figure 11:
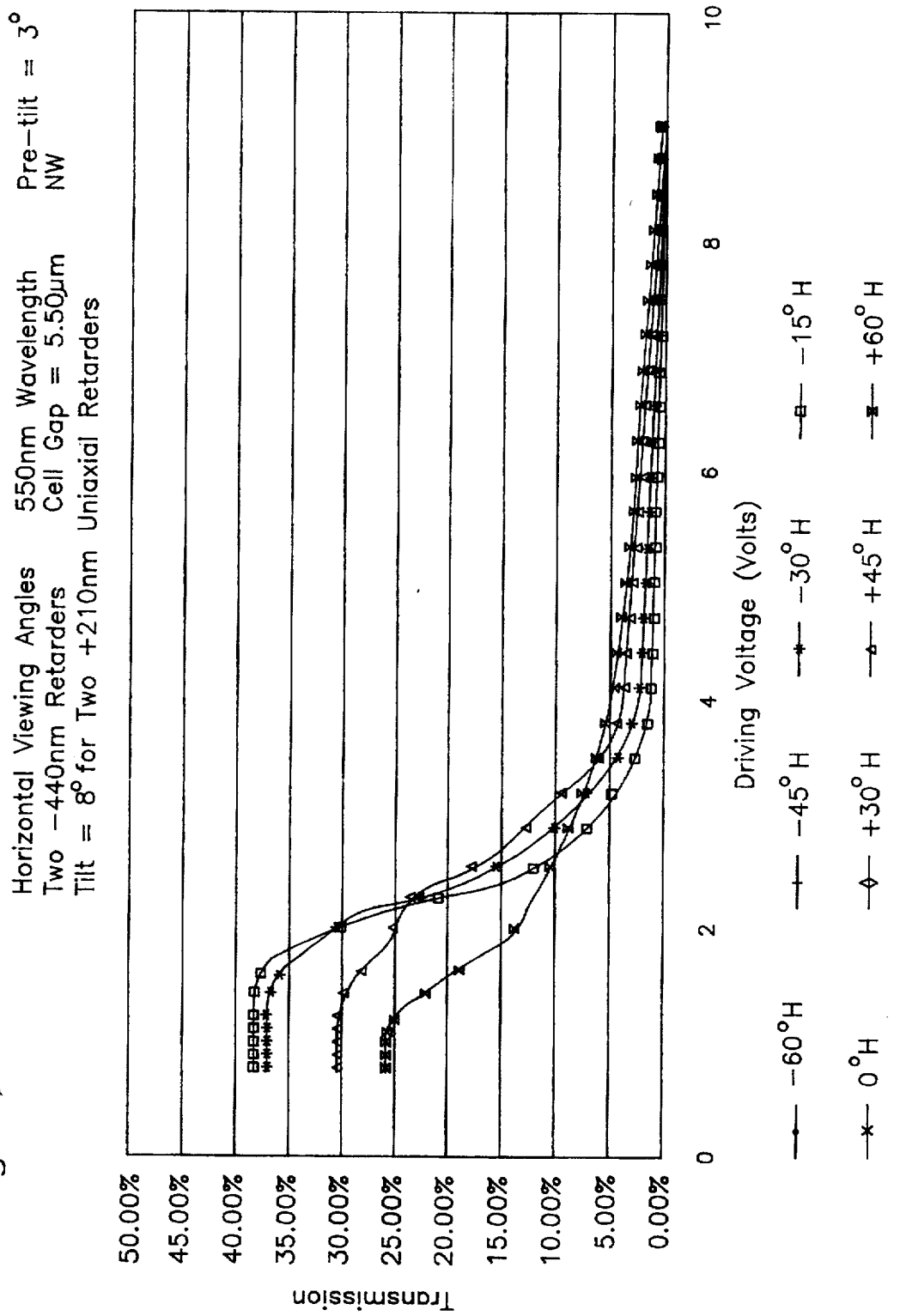

FIG. 11 is a computer simulation transmission vs. driving voltage graph of the NW TN LCD of FIGS. 5–7 where the tilted retarders optical axes were tilted about 8° from normal, this graph plotting a plurality of horizontal viewing angles aligned along the 0° vertical viewing axis.

Figure 12:
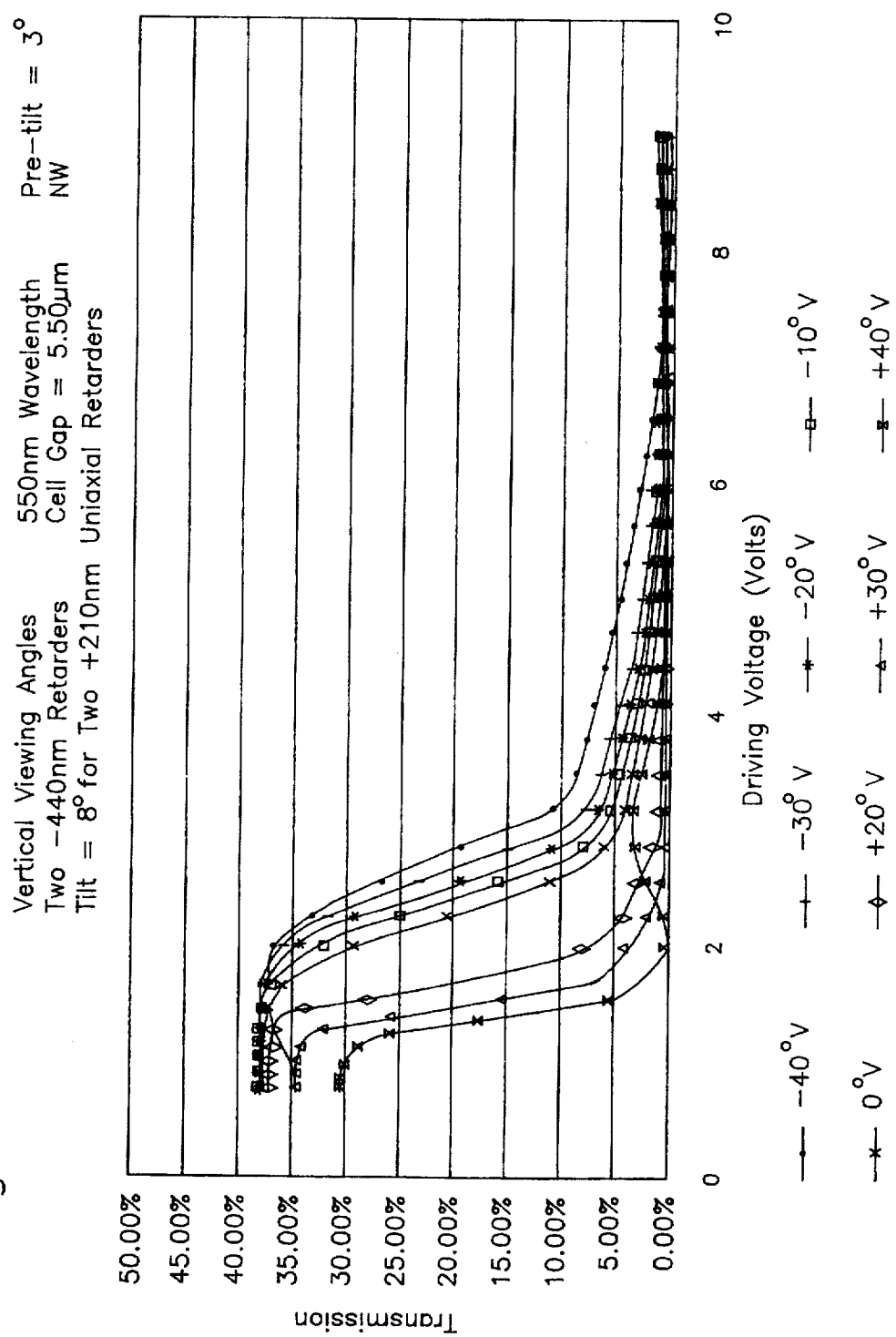

FIG. 12 is a computer simulation transmission vs. driving voltage graph of the FIG. 11 LCD, this graph plotting a plurality of vertical viewing angles aligned along the 0° horizontal viewing axis.

Figure 13:
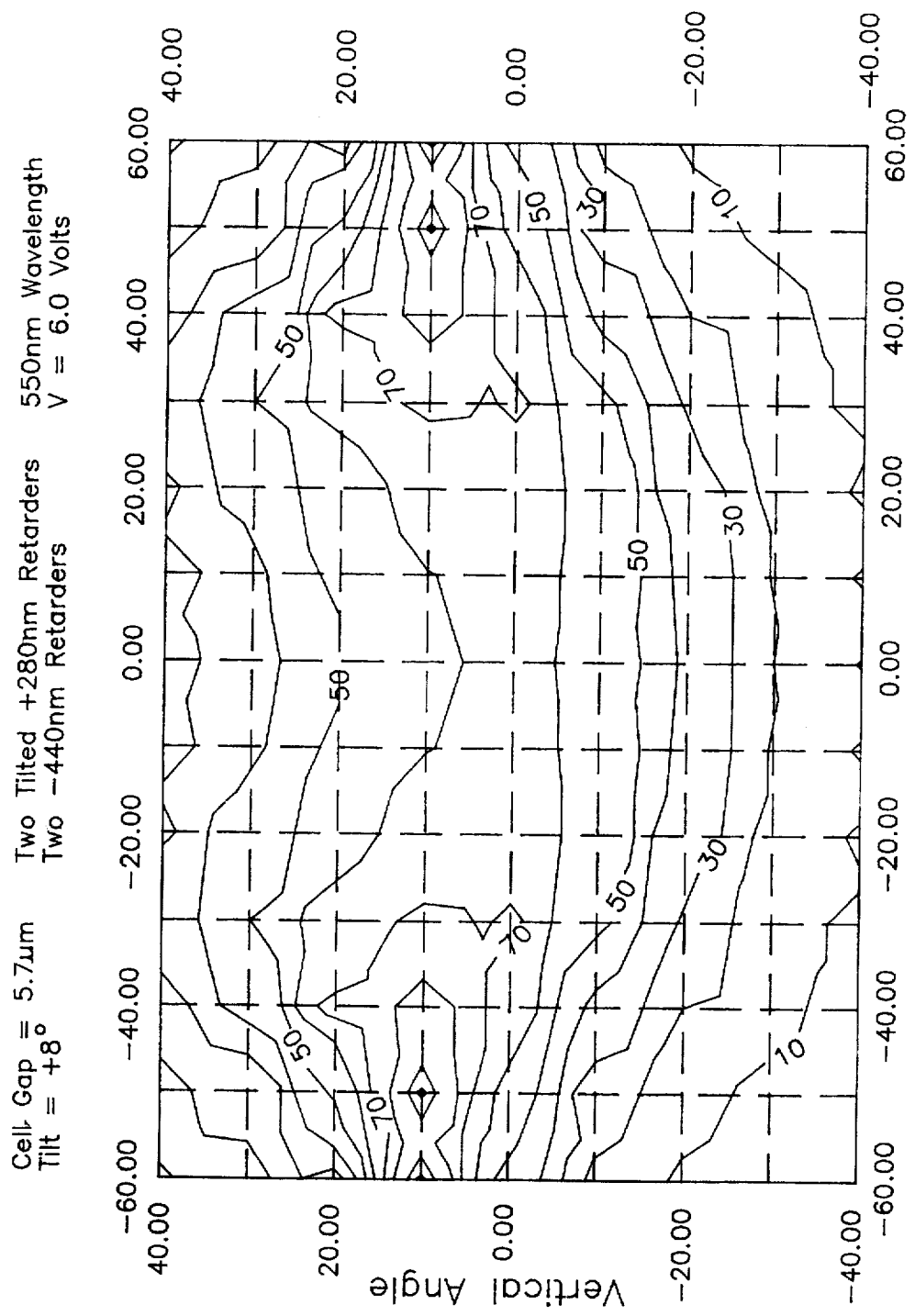

FIG. 13 is a computer simulation contrast ratio contour plot of a normally white LCD similar but not identical to the FIGS. 11–12 NW TN LCD.

Figure 14:
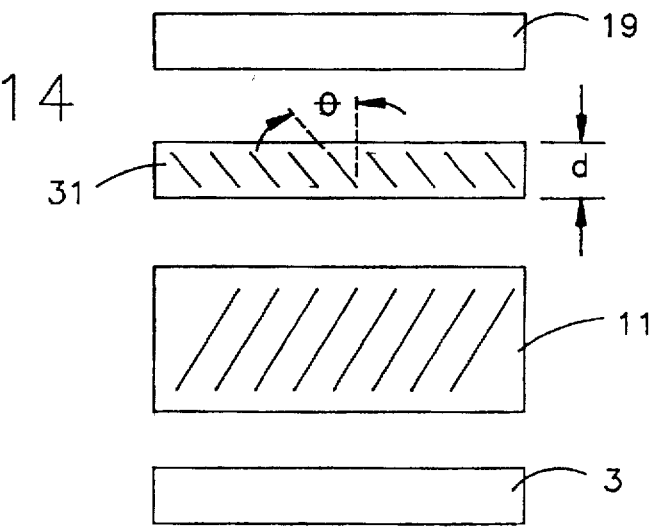

FIG. 14 is an exploded side schematic of a NW liquid crystal display provided with a tilted retarder according to another embodiment of this invention.

Figure 15:
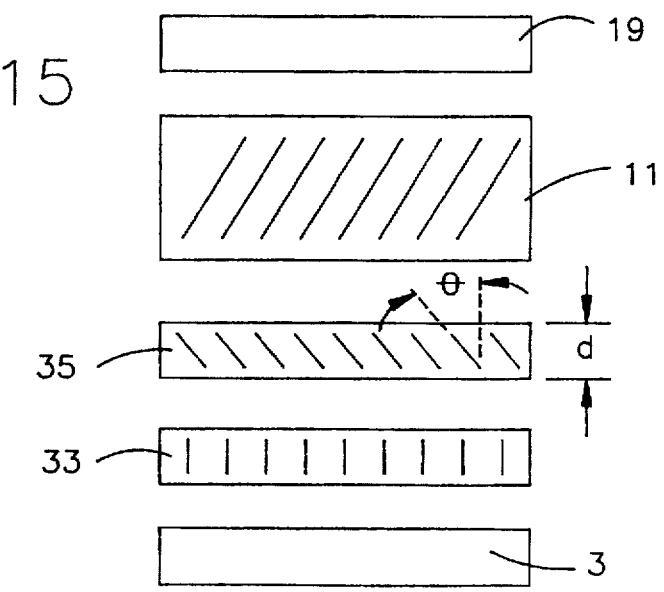

FIG. 15 is an exploded side schematic of a liquid crystal display provided with a tilted retarder according to yet another embodiment of this invention.

Figure 16:
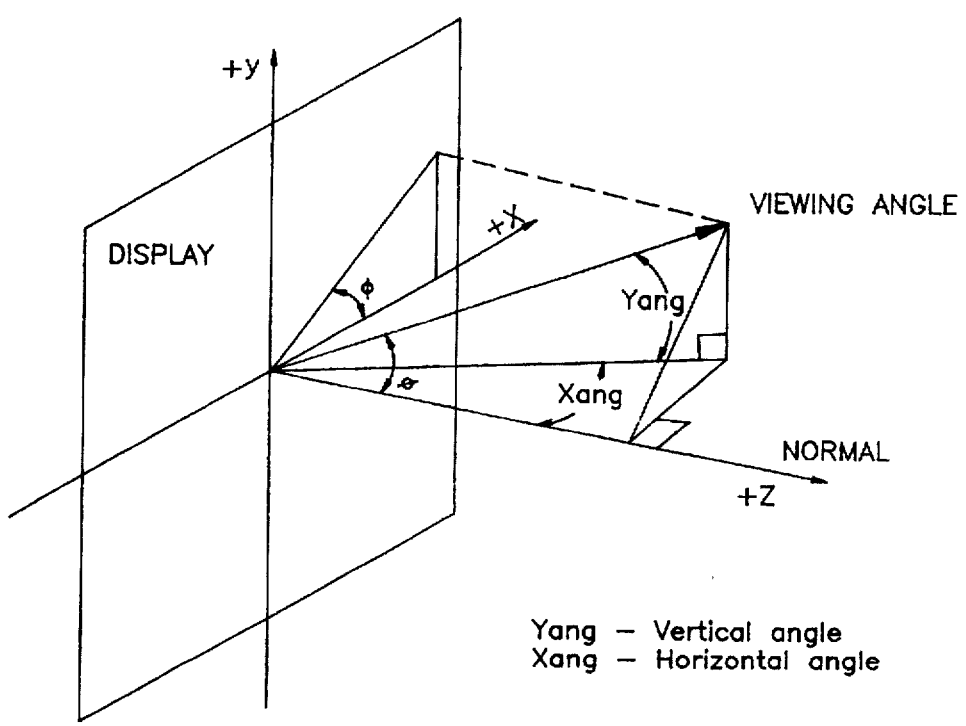

FIG. 16 is a definitional graph illustrating the angular relationship between the horizontal and vertical viewing angles discussed herein, and their relationship with the conventional LCD angles: azimuthal angle φ; and polar angle Θ.

DETAILED DESCRIPTION OF CERTAIN EMBODIMENTS OF THIS INVENTION

Referring now more particularly to the accompanying drawings in which like reference numerals indicate like parts throughout the several views.

FIG. 5 is an exploded schematic view of the optical components and their respective orientations of a normally white twisted nematic LCD according to a first embodiment of this invention. As shown, this NW LCD assembly includes from the rear forward toward the viewer, conventional backlight 1, rear or light entrance linear polarizer 3, retardation film 5, tilted retardation film 7, rear buffing or orientation film 9, liquid crystal layer 11, front buffing or orientation film 13, tilted retardation film 15, retardation film 17, and finally front or light exit linear polarizer 19. All of these components define planes substantially perpendicular to normal. Tilted retarders 7 and 15 substantially solve the above-discussed inversion problems as will be discussed below.

Backlight 1 is conventional in nature and emits substantially collimated light toward rear linear polarizer 3 of the display panel. Backlight 1 may be, for example, the backlighting assembly disclosed in commonly owned U.S. Pat. No. 5,161,041, the disclosure of which is hereby incorporated herein by reference. Alternatively, other conventional backlights may be used.

Rear and front linear polarizers 3 and 19 respectively are conventional in nature and have their respective linear transmission axes oriented at right angles to one another such that the display is of the normally white twisted nematic type according to certain embodiments. Thus, when a driving voltage below $V_{th}$ (threshold voltage) is applied across liquid crystal layer 11, the transmission axes of polarizers 3 and 19 are oriented such that the light emitted from backlight 1 proceeds through rear polarizer 3, is twisted (e.g. about 90°) by LC layer 11, and exits polarizer 19 so as to allow the "off-state" particular pixel(s) to appear white to the viewer. In other words, a pixel to which a voltage less than $V_{th}$ is applied is in the "off state" and appears substantially white to the viewer.

However, when a substantial driving voltage is applied across a selected pixel(s), the light transmitted through rear polarizer 3 and LC layer 11 is substantially blocked by front linear polarizer 19 due to the fact that the polarization direction of the light reaching the interior surface of front polarizer 19 is substantially perpendicular to the direction of the transmission axis of polarizer 19 thereby resulting in substantially no light reaching the viewer. Accordingly, in a NW display the selected pixels to which a driving voltage greater than $V_{th}$ is applied appear at least partially darkened to the viewer, these pixels said to be in the "on state". The opposite is true in a NB LCD.

In FIG. 5, the transmission axes of polarizers 3 and 19 are arranged substantially perpendicular to one another so as to define a normally white twisted nematic display. Alternatively, they may be arranged substantially parallel to one another to form a normally black cell or may be arranged in combination with LC layer 11 so as to form a super twisted nematic (STN) LCD according to other embodiments of this invention.

Rear and front orientation films 9 and 13, respectively, are conventional in nature and made of a substantially transparent polyimide material in certain embodiments of this invention. Rear orientation film 9 is conventionally buffed in a direction substantially perpendicular to the buffing direction of front film 13. According to the FIG. 5 embodiment, the buffing direction of rear orientation film 9 is substantially parallel to the transmission axis of rear polarizer 3, while the buffing direction of front orientation film 13 is substantially parallel to the transmission axis of front linear polarizer 19. The buffing of films 9 and 13 allows the molecules of liquid crystal layer 11 to be twisted from about 80°–100°, most preferably about 90°, when in the off or non-driven state.

The amount of voltage applied across liquid crystal (LC) layer 11 by surrounding electrodes 23 and 25 (see FIG. 7) determines the degree of twisting of the LC molecules in layer 11 and thus dictates the polarization direction of light emitted from the front or viewer side of LC layer 11. In turn, the polarization direction of light reaching front polarizer 19 dictates the amount of light which reaches the viewer in that the closer aligned the polarization direction of light reaching polarizer 19 and the polarizer's transmission axis, the more light which is allowed to pass and reach the viewer.

Figure 3:
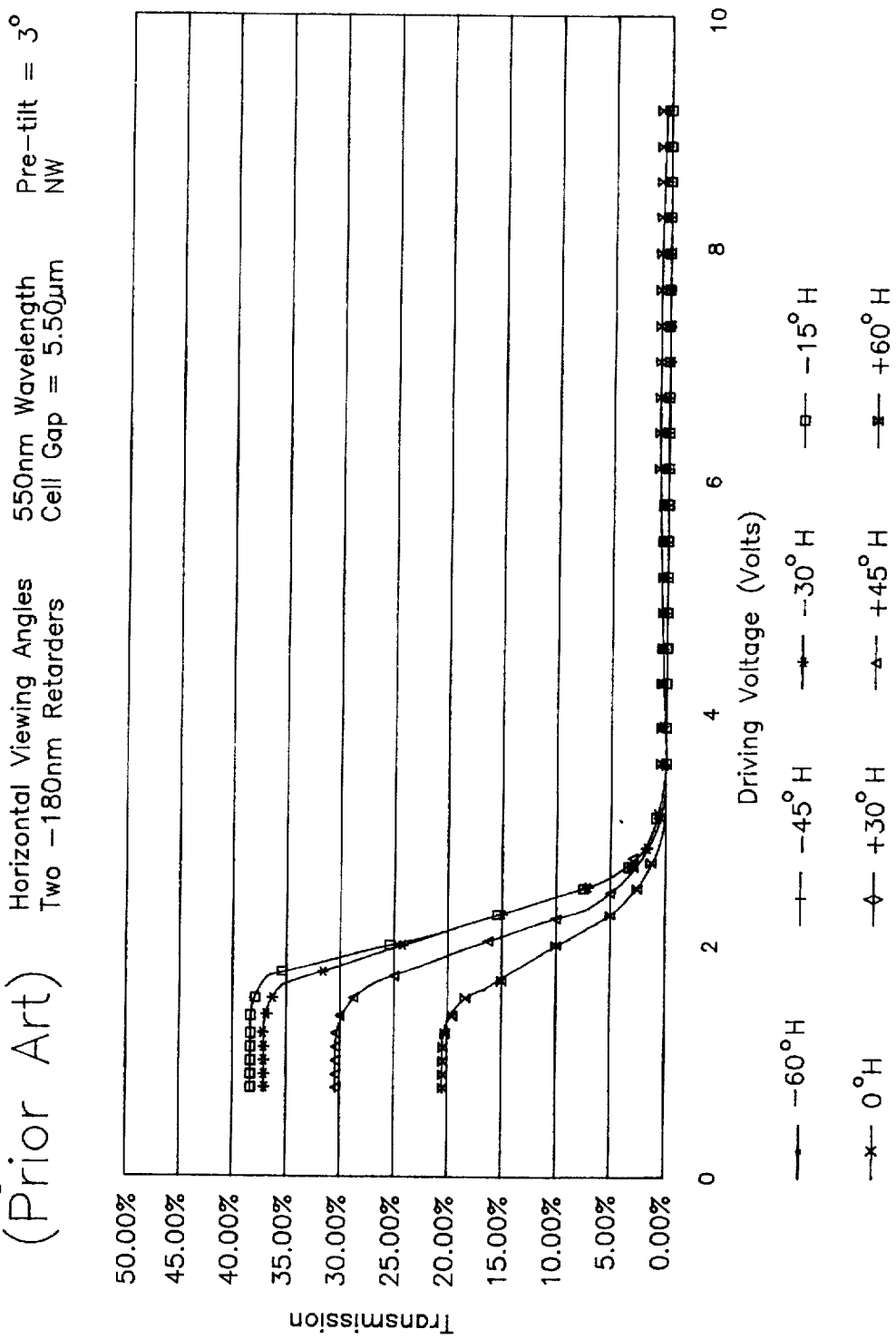
FIG. 3 is a computer simulation transmission vs. driving voltage graph of a prior art normally white LCD having a pair of negatively birefringent retarders, this graph plotting a plurality of horizontal viewing angles aligned along the 0° vertical axis.

Retardation films 5 and 17 are conventional in nature. Retardation film 5 is located between liquid crystal layer 11 and rear polarizer 3. Retardation film 17 is located between front polarizer 19 and liquid crystal layer 11 on the front side of the panel. Retardation films 5 and 17 may be of the negatively birefringent type as disclosed in U.S. Pat. Nos. 5,071,997 and 5,344,916, the disclosures of which are incorporated herein by reference. As shown in FIG. 6, such negatively birefringent retardation films 5 and 17 have their optical axes aligned substantially perpendicular to the plane of the film. In other words, the optical axes of retarders 5 and 17 in this embodiment are substantially parallel to the normal direction. It is noted that films 5 and 17 of the negatively birefringent type were provided in the normally white LCD simulated in prior art FIGS. 3–4, with the retardation value of each film being about −180 nm.

Alternatively, retarders 5 and 17 may be of the positively birefringent uniaxial type according to certain other embodiments of this invention. Biaxial retarders may also be used as films 5 and 17 in certain further embodiments of this invention.

Tilted retardation films or retarders 7 and 15 are disposed on opposite sides of liquid crystal layer 11 as illustrated in FIGS. 5–7. Tilted retarder 7 is located between rear orientation film 9 and retarder 5 while tilted retarder 15 is located between front orientation film 13 and retarder 17. Retarders 7 and 15 are made of positively birefringent material and may be of the uniaxial type according to certain embodiments.

As shown in FIG. 6, the optical axis of each tilted retardation film 7 and 15 is arranged so as to define an angle Θ with normal. In other words, while the optical axes of negatively birefringent retarders 5 and 17 are substantially parallel to normal (see FIG. 6), the optical axes of tilted retarders 7 and 15 are tilted at an angle Θ with respect to normal. Tilt angle Θ may be from about 3° to 20° in either direction according to certain embodiments of this invention. More preferably, Θ is from about 5°–15°, and most preferably is from about 7°–10° with respect to normal.

As shown in FIG. 6, the optical axis of liquid crystal layer 11 when a gray level voltage is applied is substantially tilted (e.g. from about 10° to 60°) at the center of the LC layer with respect to normal, but in the opposite direction as the tilt of the optical axes of retarders 7 and 15. In other words, while the axis of LC layer 11 is tilted in the positive direction with respect to normal (or is rotated clockwise) in the illustrated embodiment, the axes of tilted retarders 7 and 15 are tilted in the negative direction with respect to normal (or rotated in a counterclockwise direction) as illustrated in FIG. 6. In effect, the retardation of films 7 and 15 substantially cancels out the retardation caused by LC layer 11.

By introducing an offset in overall tilt by adding tilted retarders 7 and 15 with the tilt direction of the axes of retarders 7 and 15 being opposite the tilt direction of LC layer 11, the adverse effects of inversion discussed above are greatly reduced. Furthermore, in order to compensate for the phase retardation of both LC layer 11 and tilted retarders 7 and 15, negatively birefringent retarders 5 and 17 are provided so as to have retardation values equal to approximately the sum of that of LC layer 11 and the tilted retarders, but opposite in sign. Tilted retarders 7 and 15, as well as conventional retarders 5 and 17, are provided on opposite sides of LC layer 11 for purposes of viewing symmetry. Likewise, retarder 7 and 15 have substantially equivalent retardation values according to certain embodiments of this invention as do retarders 5 and 17.

FIG. 7 is a side cross-sectional view of the liquid crystal display panel of FIGS. 5–6. Glass or plastic substrates 21 are provided on opposite sides of liquid crystal layer 11 so as to support the surrounding layers. Also, common electrode 23 and pixel electrodes 25 are provided for selectively applying driving voltages across LC layer 11.

FIGS. 8(a)–8(c) illustrate a method of making tilted retarders 7 and 15 according to an embodiment of this invention. To start with, a conventional positively birefringent uniaxial retardation film 27 is provided as shown in FIG. 8(a). Retardation film 27 may be, for example, Model No. NRF-300 which is commercially available from Nitto Denko Corporation, Japan, or Nitto Denko America, Inc., New Brunswick, N.J.

In order to make tilted retarders 7 and 15, retarder 27 is cut at angle Θ into a plurality of different pieces 31. The original retarder 27 as illustrated in FIG. 8(a) is cut along lines 29 which define angle Θ with normal. The resulting pieces 31 are then turned and arranged as illustrated either in FIG. 8(b) or FIG. 8(c) so as to make tilted retardation films 7 and 15. The previous top and bottom (in FIG. 8(a)) surfaces of pieces 31 are now adhered to one another. Pieces 31 are held together by any conventional index matching isotropic adhesive according to certain embodiments of this invention. As a result of the cutting of original retarder 27 and the reorientation of its pieces 31 as illustrated in FIGS. 8(b) and 8(c), the optical axis of the resulting tilted retarder (7, 15) is now defined at an angle Θ with respect to normal instead of the previous angle which was perpendicular to normal.

The advantages resulting from the addition of tilted retarders 7 and 15 are illustrated in FIGS. 9–13. FIGS. 9–10 are computer simulation transmission vs. driving voltage graphs of the TN normally white liquid crystal display oriented as illustrated in FIGS. 5–7. This display had a cell gap of 5.50 μm, a pretilt angle of about 3°, two +210 nm uniaxial tilted retarders 7 and 15, two −440 nm negatively birefringent polyimide retarders 5 and 17, and utilized a wavelength of about 550 nm. The optical axes of tilted retarders 7 and 15 were tilted about 10° from normal thereby defining Θ as 10° in these simulations.

The vertical axis of each FIGS. 9–10 graph indicates the amount (%) of light from the backlight which is permitted to pass through the entire LCD panel including the polarizers. The horizontal axis of each of FIGS. 9–10 illustrates the driving voltage in volts applied to the display via electrodes 23 and 25.

A plurality of horizontal viewing angles (−60° to +60°) aligned along the 0° vertical viewing axis were plotted in FIG. 9. As shown, each resulting curve decreased continually and substantially monotonically in the gray level range as the driving voltage increased. Therefore, there were no inversion humps and gray level behavior of the display at these angles was excellent. In this and all other horizontal viewing angle graphs herein, the positive and negative curves for each angular degree plotted substantially overlap one another due to display symmetry. This is not the case with the vertical viewing angles plotted.

Figure 4:
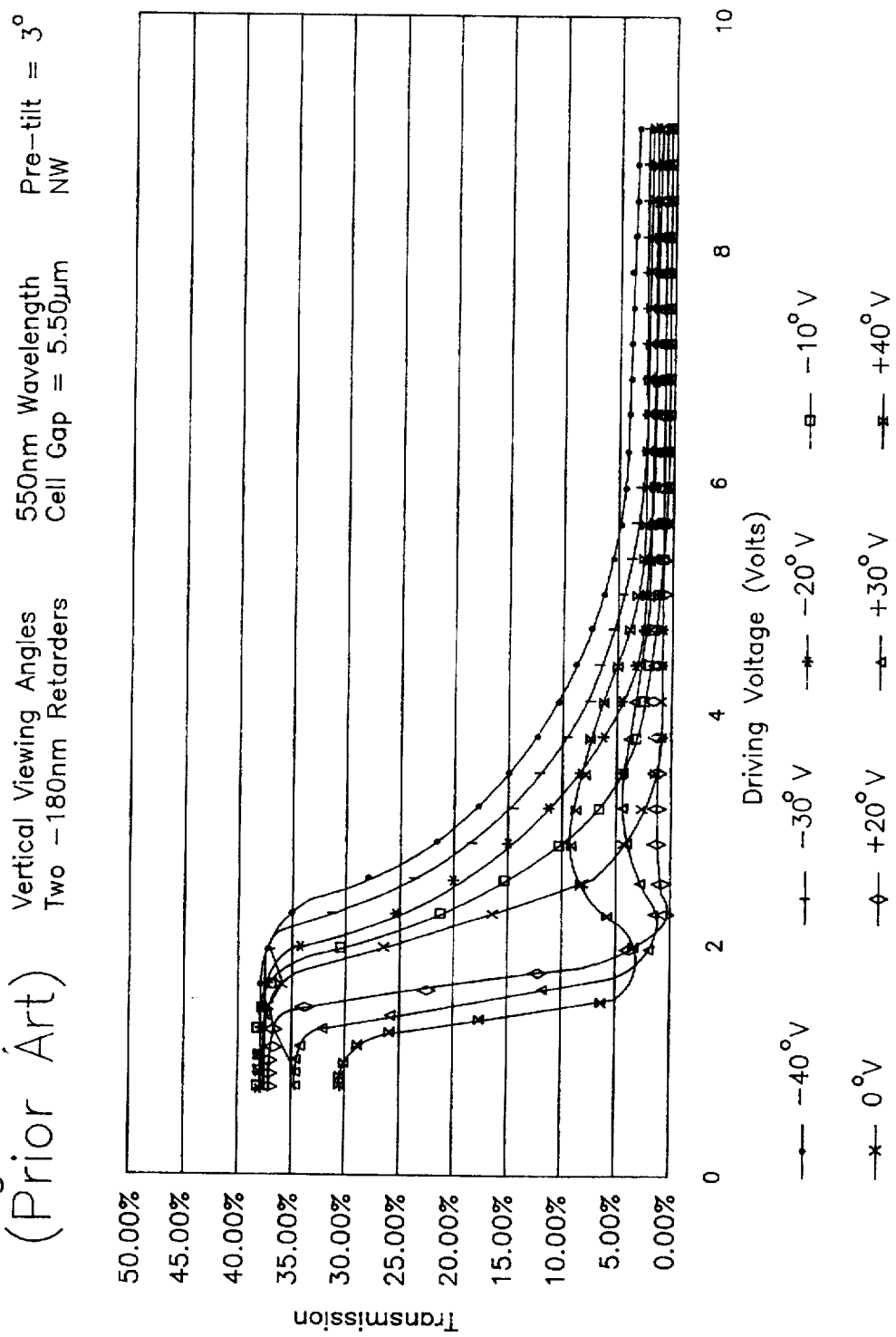
FIG. 4 is a computer simulation transmission vs. driving voltage graph of the prior art LCD of FIG. 3, this graph plotting a plurality of vertical viewing angles aligned along the 0° horizontal viewing axis.

FIG. 10 plotted a plurality of vertical viewing angles (−40° to +40°) aligned along the 0° horizontal viewing axis. As shown, each resulting curve (except for +40°) decreased substantially continually and monotonically in the gray level range thereby resulting in no inversion humps and excellent gray level display performance. While the +40° curve of FIG. 10 does, in fact, define a slight inversion hump, it is much smaller than the +40° hump illustrated in prior art FIG. 4. The presence of tilted retarders 7 and 15 (Θ at 10°) in the display thus reduced the size of the +40° inversion hump of FIG. 4 from an upward limit of about 9%–10% to one of only about 2% as shown in FIG. 10. Additionally, the +30° inversion hump of prior art FIG. 4 is apparently not present in FIG. 10 due to the addition of tilted retarders 7 and 15.

Accordingly, the addition of tilted retarders 7 and 15 with optical axes tilted about 10° from normal resulted in the TN normally white display having substantially no inversion in both the horizontal viewing angles plotted in FIG. 9 and the vertical viewing angles plotted in FIG. 10. Therefore, the display's gray level behavior was improved significantly to allow viewers to see the same image at substantially all viewing angles.

FIGS. 11–12 are computer simulation transmission vs. driving voltage graphs of the normally white TN display of FIGS. 9–10 except that the retarder tilt angles in FIGS. 11–12 is 8° instead of the 10° tilt in FIGS. 9–10. As illustrated in FIGS. 11–12, when the optical axes of tilted retarders 7 and 15 are tilted about 8° from normal (as shown in FIG. 6), substantially all gray level inversion is eliminated in the horizontal viewing angles shown in FIG. 11 along the 0° vertical axis. With respect to the vertical angles plotted along the 0° horizontal axis in FIG. 12, nearly all gray level inversion is eliminated except for a small inversion hump at 40° vertical, 0° horizontal. Again, this inversion hump in the +40° curve is significantly smaller than that of prior art FIG. 4 thus defining a significant improvement over the prior art with respect to the gray level behavior of the LCD.

FIG. 13 is a computer simulation contrast ratio contour plot of a TN normally white LCD with optical features oriented as illustrated in FIGS. 5–7. This LCD had two positively birefringent and uniaxial tilted retarders 7 and 15 having 280 nm retardation values, one such retarder located on each side of the LC layer. This display also utilized two negatively birefringent polyimide retarders 5 and 17 having retardation values of −440 nm. In the FIG. 13 simulation, 6.0 volts was applied across the LC material and a wavelength of about 550 nm was used. The optical axis of each tilted retarder 7 and 15 was tilted about 8° from normal thus defining Θ as 8°.

As shown in FIG. 13, this normally white LCD had a contrast ratio of at least about 65 or 65:1 at normal (0° horizontal, 0° vertical), at least about 10:1 at 0° horizontal, ±40° vertical, and at least about 40 or 40:1 at 0° vertical, ±60° horizontal. Contrast ratio is one of the most important attributes used in determining the quality of a liquid crystal display as will be appreciated by those of ordinary skill in the art. The contrast ratios in this normally white display were determined in low ambient conditions by dividing the "off state" light transmission by the "on state" or darkened intensity. For example, if the "off state" transmission was 200 fL at a particular viewing angle and the "on state" transmission was 5 fL at the same viewing angle, then the display's contrast ratio at that particular viewing angle would have been 40 or 40:1 for the particular driving voltage utilized.

Figure 1:
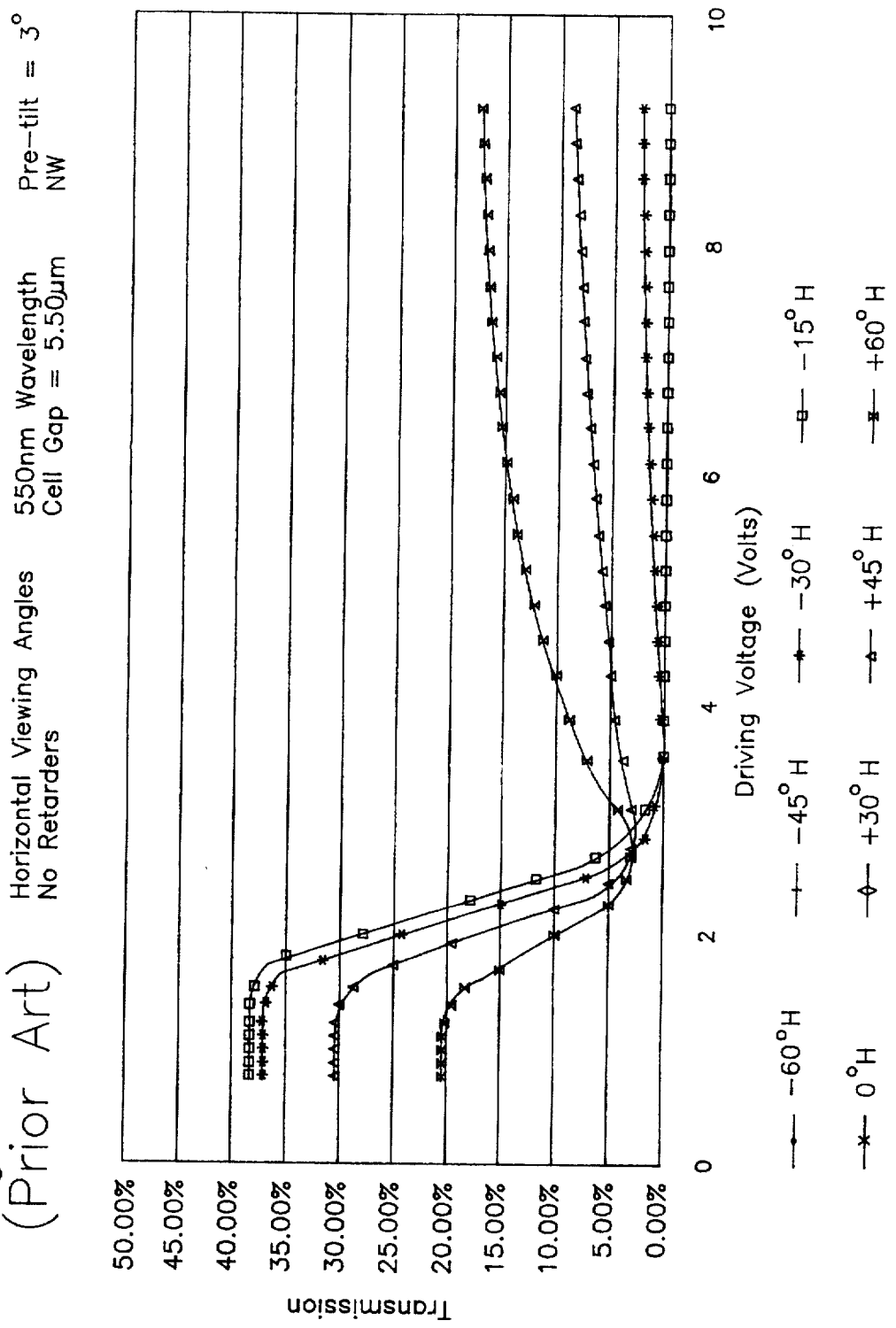
FIG. 1 is a computer simulation graph of a prior art normally white LCD having no retarders, this graph plotting light transmission vs. driving voltage for a plurality of horizontal viewing angles.
Figure 2:
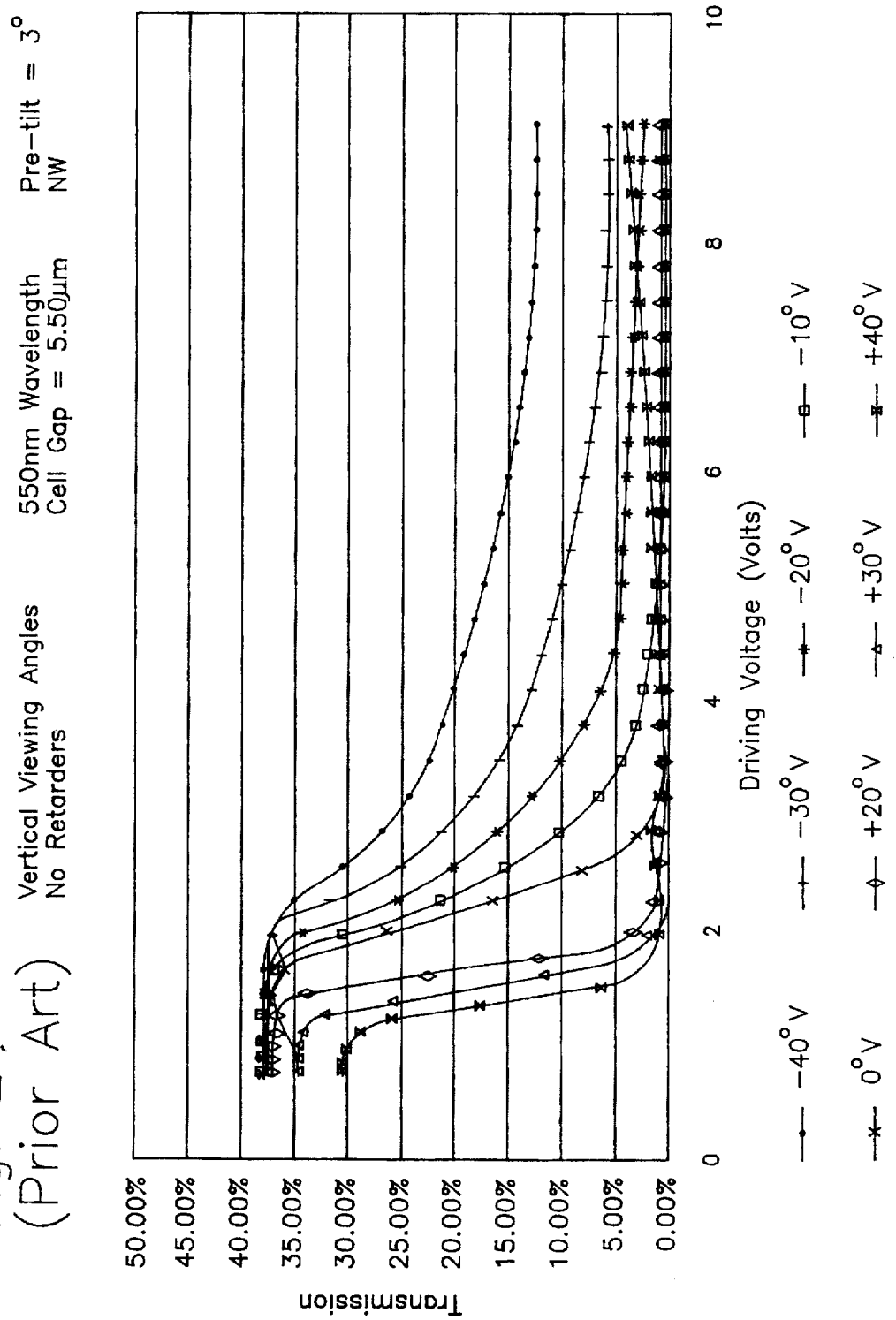
FIG. 2 is a computer simulation transmission vs. driving voltage graph of the prior art normally white LCD of FIG. 1, this graph plotting a plurality of vertical viewing angles aligned along the 0° horizontal viewing axis.

The FIG. 13 simulation can be compared to a prior art simulation illustrated in FIG. 1 of U.S. Ser. No. 08/235,691, the disclosure of which is incorporated herein by reference. Comparison between these two contrast ratio graphs illustrates the improved contrast ratios of a normally white display including tilted retarders 7 and 15.

FIG. 14 is an exploded side view of the optical components of an LCD according to another embodiment of this invention. As shown, this display includes liquid crystal layer 11, rear linear polarizer 3, front linear polarizer 19, and tilted retarder 31. The optical axis of tilted retarder 31 defines an angle Θ with normal, with the optical axis of LC layer 11 being tilted (when a gray level voltage is applied) in the opposite direction with respect to normal as the optical axis of tilted retarder 31 so as to allow the retardations of LC layer 11 and retarder 31 to substantially cancel one another out thereby leading to improved viewing characteristics of the display. It is noted that according to the FIG. 14 embodiment, no other retardation films are provided thus emphasizing the fact that tilted retarder 31 may be used in combination with an LCD having no other retarders.

FIG. 15 is an exploded side view of the optical components of an LCD according to yet another embodiment of this invention. As shown in FIG. 15, this LCD includes rear polarizer 3, liquid crystal layer 11, front polarizer 19, conventional negatively birefringent retardation film 33, and tilted retarder 35. Again, the optical axis of tilted retarder 35 defines an angle Θ with respect to normal with the tilt direction of the retarder axis with respect to normal being opposite of that of the optical axis of LC layer 11 when a gray level voltage is applied. As evident by the FIG. 15 embodiment, tilted retarder 35 may also be used in combination with a negatively birefringent retarder 33 on only one side of LC layer 11.

According to certain alternative embodiments of this invention, tilted retarder 35 may be used in combination with any other type of conventional retarder on either or both sides of LC layer 11.

FIG. 16 illustrates the angular relationships between the horizontal and vertical viewing axes and angles described herein (e.g. see FIG. 13) relative to a liquid crystal display and conventional LCD angles φ and Θ. This angle Θ is, of course, different from the angle Θ illustrated in FIGS. 6 and 8 with respect to the tilted retarder axes. The horizontal viewing angles (or $X_{ANG}$) and vertical viewing angles (or $Y_{ANG}$) illustrated and described herein may be transformed to conventional LCD angles: azimuthal angle φ; and polar angle Θ, by the following known equations:

$$TAN\ (X_{ANG}) = COS\ (\phi) \cdot TAN\ (\Theta)$$

$$SIN\ (Y_{ANG}) = SIN\ (\Theta) \cdot SIN\ (\phi)$$

or $$COS\ (\Theta) = COS\ (Y_{ANG}) \cdot COS\ (X_{ANG})$$

$$TAN\ (\phi) = TAN\ (Y_{ANG}) \div SIN\ (X_{ANG})$$

Once given the above disclosure, many other features, modifications, and improvements will become apparent to the skilled artisan. Such other features, modifications, and improvements are therefore considered to be a part of this invention, the scope of which is to be determined by the following claims:

I claim:

1. A liquid crystal display comprising:

a liquid crystal layer;

a rear polarizer having a transmission axis;

a front polarizer disposed on the viewer side of the liquid crystal layer so that the liquid crystal layer is disposed between the front and rear polarizers;

first and second tilted retardation films on opposite sides of the liquid crystal layer, said first and second tilted retardation films being positively birefringent and uniaxial, and each having an optical axis tilted or at an oblique angle relative to a normal axis that is substantially perpendicular to a surface of one of said tilted retardation films;

first and second negative retarders located on opposite sides of the liquid crystal layer, said first and second negative retarders each having an optical axis substantially parallel to the normal axis; and wherein said negative retarders and said tilted retardation films have retardation values and axis alignment such that the display exhibits a contrast ratio, when a 550 nm wavelength is used, of at least about 10:1 over a horizontal angular span of at least about 120° and over a vertical angular span of at least about 80°.

2. The display of claim 1, wherein said front and rear polarizers are arranged relative to one another so as to define a normally white twisted nematic display.

3. The display of claim 2, wherein d.Δn of the liquid crystal layer is from about 380–550 nm.

4. The display of claim 1, wherein the contrast ratio at 550 nm is at least about 40 or 40:1 at 0° vertical, ±60° horizontal.

5. The display of claim 1, wherein said polarizer and retardation axes are oriented relative to one another so that when gray level voltages of from about 2.25 volts to 6.5 volts are applied across the liquid crystal there are substantially no inversion humps or rises at horizontal viewing angles of from about −60° to +60° and at vertical viewing angles of from about 40° to +40°.

* * * * *